(12) United States Patent
Cosenza

(10) Patent No.: US 6,619,898 B1
(45) Date of Patent: Sep. 16, 2003

(54) FASTENER/DEFLECTABLE RETAINING RING ASSEMBLY

(75) Inventor: Frank J. Cosenza, Santa Barbara, CA (US)

(73) Assignee: Huck Patents, Inc., Wilmington, DE (US)

( * ) Notice: Subject to any disclaimer, the term of this patent is extended or adjusted under 35 U.S.C. 154(b) by 0 days.

(21) Appl. No.: 10/097,515

(22) Filed: Mar. 13, 2002

(51) Int. Cl.⁷ ................................................ F16B 21/18
(52) U.S. Cl. ...................... 411/353; 411/520; 411/521; 411/999
(58) Field of Search ................................ 411/352, 353, 411/207, 516, 517, 590, 521, 525, 526, 999

(56) References Cited

U.S. PATENT DOCUMENTS

| | | | |
|---|---|---|---|
| 4,844,677 A | * | 7/1989 | Schwartzman |
| 4,911,726 A | | 3/1990 | Warkentin |
| 5,509,752 A | * | 4/1996 | Kocisek |

* cited by examiner

Primary Examiner—Flemming Saether
(74) Attorney, Agent, or Firm—Christie, Parker & Hale, LLP

(57) ABSTRACT

A fastener assembly having an elongated shaft with an exterior surface defining a plurality of open-ended longitudinally-extending splines on one end of the shaft and a second plurality of longitudinally-oriented closed-ended spline circumferentially spaced from the first splines. The assembly includes a substantially triangular retaining ring having an inwardly directed tab is positioned in the middle of each side of the ring. Cross-over slots interconnect the first and second splines and are sized to require the retaining ring tabs to flex to permit transition of the ring tabs between the first splines and the second splines.

9 Claims, 3 Drawing Sheets

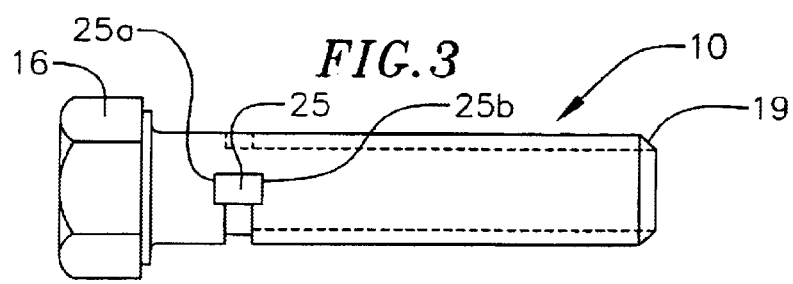
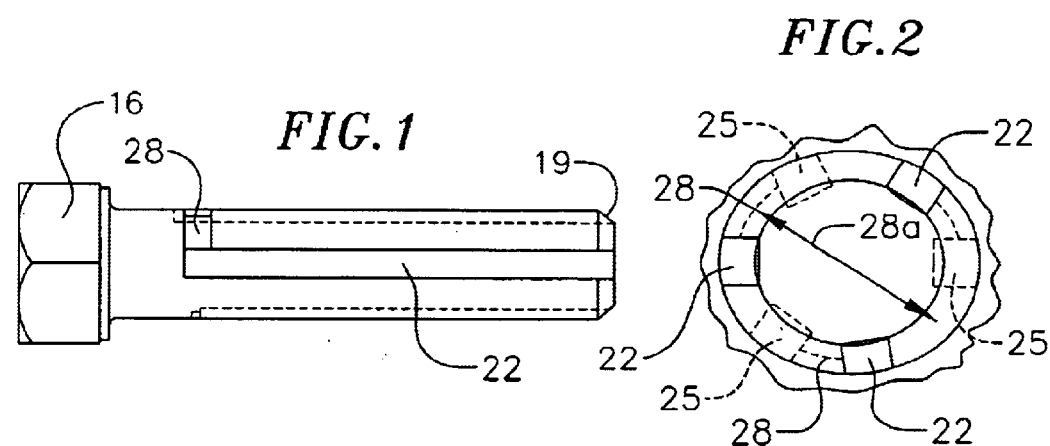
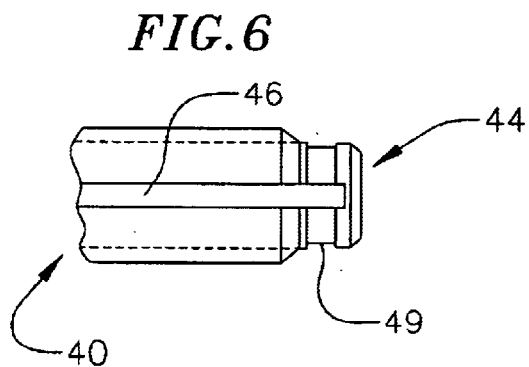
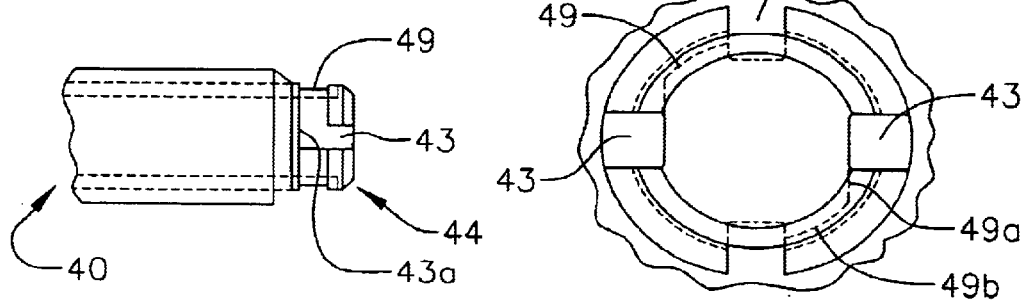

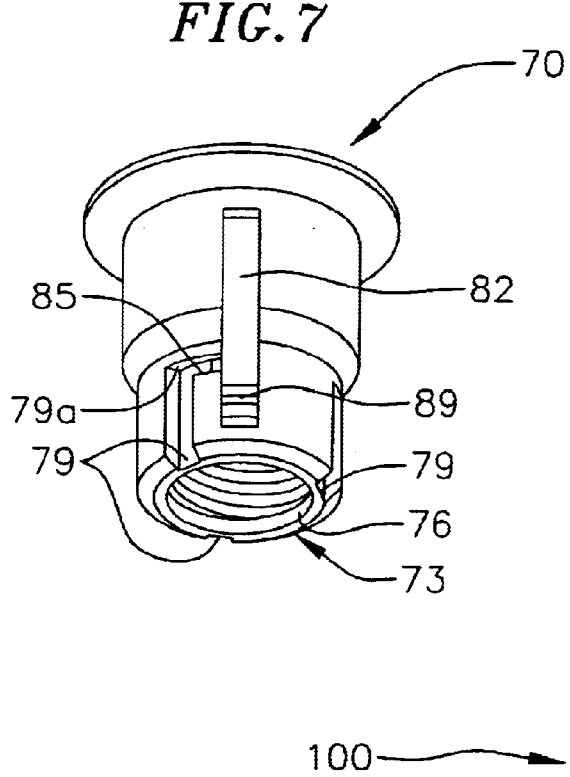
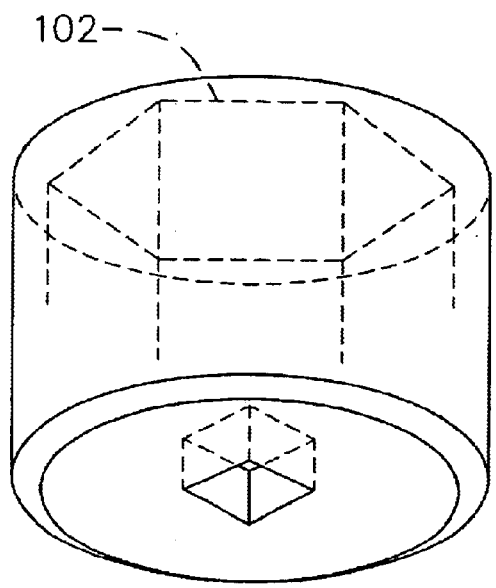
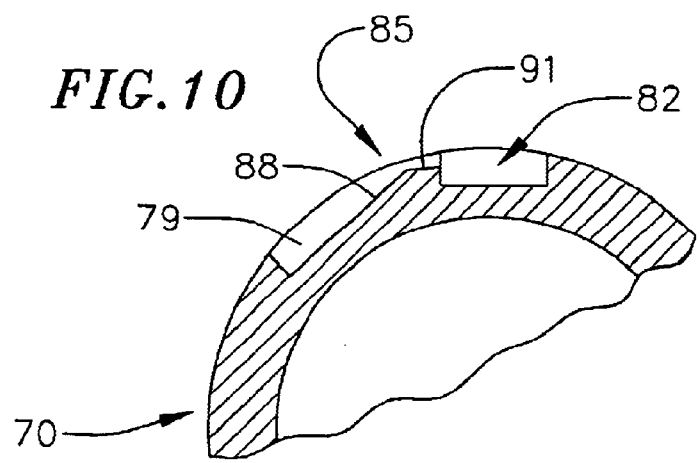

FASTENER/DEFLECTABLE RETAINING RING ASSEMBLY

BACKGROUND OF THE INVENTION

The present invention relates generally to panel fasteners, and more particularly, panel fasteners adapted to receive a deflectable retaining ring.

Panel fasteners are inserted through a hole in the panel, and then a retaining ring is attached to the fastener's threaded end. The retaining ring prevents the fastener from being extracted, yet still permits a nut to be threaded onto the fastener for securing the panel. The fastener is far less likely to be lost during disassembly and reassembly procedures.

A number of different approaches have been developed for attaching a retaining ring to a fastener. One approach involves forming a plurality of grooves or splines along the length of the fastener to receive inwardly-projecting tabs of the retaining ring. The splines extend fully to the end of the fastener opposite the head. After the retaining ring has been slid onto the fastener, an end cap is attached to the threaded end of the fastener, to close off the channels and prevent the ring from being removed. One disadvantage of this approach is that it cannot be easily or economically applied to hollow, internally-threaded fasteners.

In another approach, splines are formed along the length of the fastener, and a second set of splines is also formed along the fastener, interleaved with the first set. Both ends of each spline in the second set are so closed that a retaining ring cannot be longitudinally removed from the fastener when the retaining ring's inwardly-directed tabs engage the second set of splines. Cross-over slots individually connect the first set of open-end splines with the second set of closed splines. The retaining ring is secured to the fastener by sliding its tabs along the open-end slots to the location of the cross-over slots, and then rotating the retaining ring so as to move the tabs over to the closed splines. Extraction of the fastener from the workpiece is prevented as long as the retaining ring tabs do not exit back through the cross-over slot and open-end splines.

Although this approach is suitable for internally-threaded fasteners, it is nevertheless subject to certain drawbacks. Fastener movement during disassembly procedures sometimes leads to rotation of the retaining ring with respect to the fastener. This rotation can occasionally re-position the retaining ring tabs in the open-end splines, thus permitting inadvertent release of the retaining ring from the fastener. In order to overcome this disadvantage, the cross-over slots are sometimes displaced longitudinally relative to each other so that the ring tabs can be moved from the closed splines to the open-end splines only when the ring is tilted at an extreme angle relative to the fastener shaft. While the likelihood of an inadvertent fastener release is reduced using this latter approach, inadvertent release through random movement of the fastener can still occur.

Consequently, a fastener retaining ring combination was developed that does not rely on the orientation of the fastener with respect to a retaining ring to keep the ring attached to the fastener, but still was suitable for fasteners of both internal and external thread configurations. The fastener/retaining ring assembly of U.S. Pat. No. 4,911,726 was developed, which discloses a fastener having a generally cylindrical shaft with a first spline extending longitudinally along the length of the shaft and terminating at one end of the shaft, with a second spline extending along the shaft, circumferentially spaced from the first spline and being closed at its opposite ends, and further with a slot interconnecting the first and second splines, the cross-over slot having a depth less than the depth of the second, closed-end spline. The fastener shaft is sized to slidably receive a retaining ring having an inwardly-projecting tab that is engageable with the first and second splines and the cross-over slot. The shallow depth of the cross-over slot required the retaining ring to significantly expand or flex outwardly to allow the inwardly-projecting tab to move from the first, open-end spline to the second, closed spline. The retaining ring thus resisted displacement of the tabs between the two splines, regardless of the relative orientation of the ring and shaft. The use of a closed-end spline on the shaft's exterior surface obviated the need for an end cap, thereby making the fastener suitable for use with hollow, internally-threaded fasteners.

The fastener/ring assembly of U.S. Pat. No. 4,911,726 also disclosed an embodiment wherein the cross-over slot depth varied, thus forming a ramp leading from the first, open-end spline to the second, closed-end spline. The ramp facilitated insertion of the retaining ring tab into the closed-end spline, but did not affect the resistance to displacement of the tabs from the closed-end spline back into the open-end spline. The ramp could be smooth with a continuously varying depth, or was formed by two straight segments, or formed by a straight line segment and a continuous curve segment of constant depth.

To facilitate assembly, the retaining ring was placed in a standard hexagon socket wrench that encompasses the hexagonal exterior configuration of the retaining ring. At that point, the retaining ring was rotated clockwise over the cross-over ramp, and as the hexagon tool was rotated, the tabs engaged the ramp angle wherein the tabs reach maximum deflection on the cross-over ramp, and continued rotation caused the tabs to spring back into the closed-end slot.

The difficulty with this design is that the deflection is caused by the compressive buckling of the tabs and a portion of the outer hexagonal configuration of the retaining ring. The hexagon socket wrench engages near the corner of three of the six positions of the hexagon retaining ring. As the tabs climb up the ramp of the cross-over slot, a compressive load is transmitted through the tab to the driving surface of the hexagon socket wrench. It becomes readily apparent that the deflection occurs only in the portion of the tab of the retaining ring between the socket and the surfaces of the cross-over ramp. At this point, a compressive buckling occurs, and the actual amount of deflection is minimal. Due to the short length between the end of the tab engagement area and the hexagon socket surface, the compressive buckling load is excessive and results in material deformation of the tab end surface and the cross-over ramp surfaces. Depending on tolerancing conditions and the degree of deformation and/or wear of the tabs after installation, performance of the hold-out nibs located in the closed-end splines of the fastener may be affected. In addition, the closed-end splines at the opposite end of the head of the fastener have an abrupt surface which prevents the retaining ring from being removed. Depending on the conditions and the degree of deformation and/or wear of the tabs after installation, can affect the retention capabilities of the panel fastener. Consequently, a need exists for a fastener/deflectable retaining ring assembly that eliminates the deficiencies of previous fastener/retaining ring assembly designs.

SUMMARY OF THE INVENTION

The present invention is a fastener and deflectable retaining ring assembly having a fastener with a generally cylindrical shaft with a plurality of first splines extending longitudinally along the length of the shaft and terminating at one end of the shaft, with a plurality of second splines extending along the shaft, circumferentially spaced from the first splines and being closed at its opposite ends, and further with a cross-over slot interconnected with the first and second splines, the cross-over slot having a depth less than the depth of the second closed-end splines. The fastener shaft is sized to slidably receive a generally triangular retaining ring having inwardly-projecting tabs that are engageable with the first and second splines and the cross-over slot. The shallow depth of the cross-over slot requires the retaining ring to flex to allow the inwardly-projecting tabs to move from the first, open-end splines to the second, closed splines. The retaining ring thus resists displacement of the tabs between the two splines, regardless of the relative orientation of the ring and the shaft.

The retaining ring design addresses all of the deficiencies of previous designs and resembles a slightly bulging triangle rather than a traditional hexagon of previous retaining rings. The tabs of the retaining ring are located midway between the corner segments of the triangle rather than at the corners of the hexagon on previous designs. The retaining ring of the present invention can utilize a hexagon socket wrench to install the ring on the panel fastener. The installation process includes aligning the tabs with the open-end splines and pushing the ring toward the head of the fastener until it stops against a back wall of the open-ended splines. The socket wrench is rotated clockwise until the tabs intersect the cross-over ramp, wherein further rotation causes the tabs to spring radially outward until reaching a flat surface in the cross-over slot. Continued rotation into the closed end splines results in the tabs to snap back to their original dimension. Since the tabs are located midway between the driving corners of the hexagon tool, there is no resistance of the tabs to deflect radially except where desired. With the triangular design, the hexagon tool does not constrain or limit the allowable deflection of the tabs to pass over the ramps in the cross-over slot. This design provides a considerable larger moment arm for allowable deflection as compared to previous designs. There is no compressive buckling, but rather a predictable beam deflection. As a result, there is no appreciable damage to the ends of the tabs or the ramps in the cross-over slot of the fastener. Furthermore, the tabs return to their original internal diameter, and there is improved holdout performance with the nibs located in the closed-end splines, which improves panel fastener retention. With this design, the deflection of the tabs becomes predictable and does not exceed the yield strength.

The novel features of the present invention will be better understood from the following detailed description, as considered in connection with the accompanying drawings. It is to be understood, however, that the drawings are only for purposes of illustration and description and are not intended as a limiting definition of the present invention.

BRIEF DESCRIPTION OF THE DRAWINGS

FIG. 1 is a side view of a fastener in accordance with the present invention;

FIG. 2 is an oversized end view of the fastener of FIG. 1;

FIG. 3 is a top view of the fastener of FIG. 1;

FIG. 4 is a partial side view of an alternative embodiment fastener of the present invention;

FIG. 5 is an end view of the fastener of FIG. 4;

FIG. 6 is a top view of the fastener of FIG. 4;

FIG. 7 is a perspective view of another alternative embodiment fastener of the present invention;

FIG. 9 is a perspective view of an insertion tool of the present invention; and

FIG. 10 is an oversized, fragmentary end sectional view of the fastener of FIG. 7.

DETAILED DESCRIPTION OF THE DRAWINGS

Figure 8:
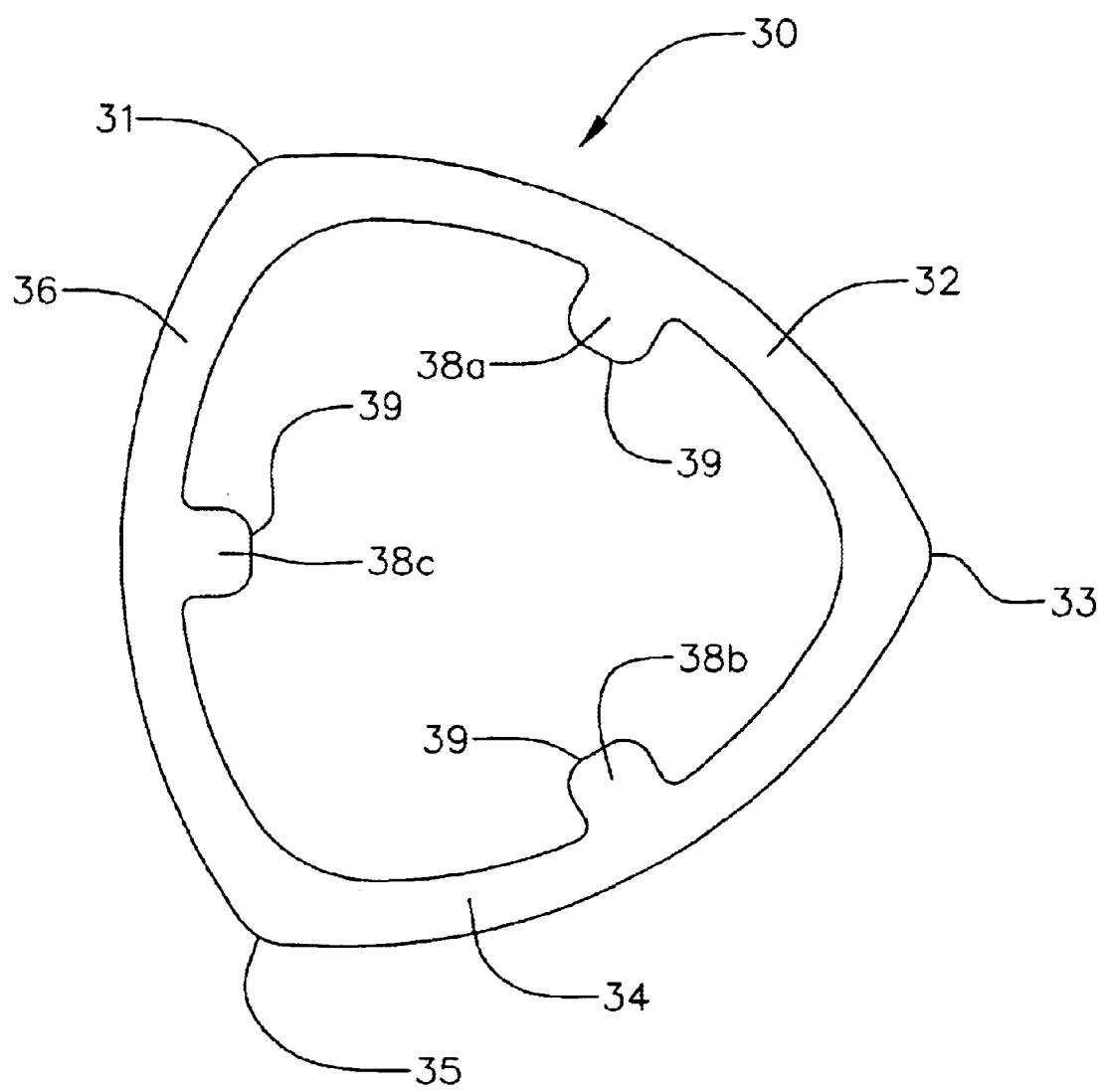
FIG. 8 is a top view of the deflectable retaining ring of the present invention.

As shown in FIGS. 1–3, a first embodiment of a fastener 10 in accordance with the present invention is illustrated. The fastener includes an elongated, externally-threaded shaft, with an enlarged head 16 at one end for engaging a panel (not shown) and a frusto-conical taper 19 at the opposite end. A first plurality of splines 22 extend longitudinally along the shaft, opening into the frusto-conical tapered end, and a second plurality of splines 25 are interleaved with the first splines. The second splines have closed ends 25a and 25b that do not extend to or open into the shaft's tapered end 19. A cross-over slot 28 interconnects each open spline 22 with a separate one of the closed splines 25.

As shown in FIG. 8, a retaining ring 30 is generally flat and is triangular in shape, having three arcuate sides 32, 34 and 36. To facilitate engagement with the fastener 10, the retaining ring includes projecting tabs 38a, 38b and 38c, one on each of sides 32, 34 and 36, respectively. In accordance with the invention, the depths of the open-ended splines 22 and the closed-end splines 25 are selected to accommodate the passage of the retaining ring tabs when the ring is being secured to the fastener 10. The cross-over slots are shallower than the splines, such that the ring 30 must expand or flex outwardly to allow the ring tabs to slide from the open-ended splines to the closed-ended splines. Alternatively stated, the diameter 28a of the fastener, as taken across the bottom of the cross-over slots 28, is greater than the inner diameter of the retaining ring as taken across the innermost edges 39 of the ring tabs 38a–c. Thus, the tabs cannot be moved between the open-end and the closed-end splines unless the retaining ring flexes outwardly of the ring's normal plane.

The retaining ring 30 is preferably, though not necessarily, made from a thin, flexible metal. Other materials are contemplated such as composites. Expansion or flexion of the ring is therefore unlikely unless the ring is deliberately forced with considerable effort. When the fastener 10 is in use with a retaining ring disposed with its tabs 38a–c engaging the closed-end splines 25, a force sufficiently high to expand the ring is seldom, if ever, encountered. Typically, the required force must be deliberately applied by an assembler directly manipulating the ring. Consequently, mere changes in the orientation of the ring with respect to the fastener are not likely to cause inadvertent release of the ring from the fastener. In addition, since only exterior splines or slots are used to secure the ring, the present invention is also suitable for use with hollow, internally-threaded fasteners, as discussed more fully below.

The cross-over slots 28 open into or join the open-end splines 22 at the ends of the splines nearest the head 16, while the slots open into the closed-end splines 25 at locations spaced from the splines' opposite ends. With this configuration, the retaining ring 30 may be more easily secured to the fastener, but less easily unsecured.

The fastener 10 is generally intended for non-retracting applications where the fastener head 16 does not move significantly from the panel. This situation is commonly encountered where only a small portion of the threaded surface of the fastener engages a complementary threaded member, such as a conventional nut. As further shown in FIGS. 1–3, the open-end splines 22 are significantly longer than the closed-end splines 25. In addition, the cross-over slot 28 is located much closer to the fastener head 16 than the fastener's opposite tapered end 19.

FIGS. 4–6 illustrate an alternative embodiment of a fastener 40 in accordance with the invention. This fastener includes an elongated shaft with a plurality of open-end splines 43 extending longitudinally a short distance from the shaft's remote end 44 and with a plurality of closed-end splines 46 extending longitudinally a much longer distance along the shaft, but terminating short of the shaft's remote end. Cross-over slots 49 connect together each open-end spline with a separate closed-end spline. Although FIGS. 1 and 3–6 illustrate a fastener having two open-end splines and two closed-end splines, it is to be understood that such a fastener for use with the retaining ring as shown in FIG. 8 would require three open-ended splines and three closed-ended splines to accommodate a retaining ring having three projecting tabs. FIG. 2 illustrates three sets of splines. It is conceivable that there can be more than three sets of open and closed-ended splines, so long as three are spaced to match the spacing of tabs 39 on retaining ring 30. FIGS. 1–6 show two sets of open and closed-end splines for ease of illustration, but it is readily understood by one of ordinary skill in the art that the number of open and closed-end splines must accommodate the number of tabs on the retaining ring. Likewise, there is one cross-over slot for each set of open and closed-end splines.

Unlike the fastener 10 of FIGS. 1–3, the fastener 40 of FIGS. 4–6 is intended for applications where a significant portion of the fastener body will threadingly engage another member, and the fastener head (not shown), when retracted, will move a significant distance from the panel (not shown). Thus, the closed-end splines 46 of the fastener 40 extend a much greater length along the fastener shaft than do the closed-end splines 25 of the fastener 10. The open-end splines 43 are significantly shorter than the open-end splines 22 of the fastener 10. For ease of assembly, the cross-over slots preferably open into the end 43a of the open-end splines 43. Similarly, the cross-over slots should preferably open into the closed-end splines at locations slightly spaced from the splines' opposite ends. This reduces the likelihood of an inadvertent transition of the retaining tabs 38a–c from the closed-end splines through the cross-over slots to the open-end splines.

As shown in FIG. 5, the bottom walls of the cross-over slots 49 form a ramp having a greater depth adjacent the open-end splines 43 and a lesser depth adjacent the closed-end splines 46. The ramp may be formed by a variety of cross-sectional shapes. Thus, the ramp of FIG. 5 may be formed by a straight section or cord 49a intersecting a curved section 49b of constant depth. Alternatively, the ramp could be formed by a curved surface of continuously-varying depth, with a maximum depth adjacent the open-end splines and a minimum depth adjacent the closed-end splines. The junctions between the cross-over slots and the closed-end splines may form a step or wall.

The ramp configuration for the cross-over slots 49 facilitates movement of the retaining ring tabs 38a–c in only one direction, from the open-end spline 43 to the closed-end spline 46. A greater effort is required to move the retaining ring tabs in the reverse direction, from the closed-end splines back to the open-end splines, because the step transition between the slots and the closed-end splines.

Another alternative embodiment fastener 70 in accordance with the present invention is illustrated in FIGS. 7 and 10. Unlike the fasteners 10 and 40 discussed above, the fastener 70 is hollow, with interior threads 76. The fastener's external surface includes three longitudinally uniformly-spaced splines 79 that extend fully to the fastener's remote end 73. Three additional longitudinal splines 82, which have closed ends and do not extend to the fastener's remote end, are interleaved with the open-end spline 79. Shallow cross-over slots 85 connect together each open-end spline 79 with a separate closed-end spline 82. The depth of the cross-over slots again is selected such that the retaining ring 30, as shown in FIG. 8, must expand or flex outwardly for its three inwardly-projecting tabs 38a–c to reverse from the open-end splines to the closed-end splines. Each cross-over slot is also preferably, but not necessarily, positioned adjacent to the closed end 79a of its open-end spline 79, but a slight distance from the opposite ends of its closed-end spline 82. Accordingly, as discussed above in connection with the externally-threaded fasteners 10 and 40, the fastener 70 may be secured to a panel by the retaining ring in a manner that does not interfere with the fastener's internal threading and in a manner that does not require any specific relative orientation for the ring and the fastener to retain an engagement.

To facilitate ease of retaining ring tabs 38a–c to transition from the open-end splines 79 to the closed-end splines 82, the depth of the cross-over slot 85 varies from a maximum depth adjacent to the open-end splines to a minimum depth adjacent to the closed-end splines. As illustrated in FIG. 10, the ramp shape at the bottom of the cross-over slots may include two straight or chordal sections 88 and 91. The first section 88 of each slot may be tangent with the bottom wall of the open-end spline, and the second section 91 may be spaced radially outwardly from the bottom wall of the closed-end spline.

Unlike the cross-over slot 49 of the retracting-type fastener 40 illustrated in FIGS. 4–6, the cross-over slots 85 of the fastener 70 connect with the closed-end splines 82 at an intermediate location along those splines. Bumps or berms 89 can be optionally provided in the bottom walls of the closed-end splines, at the ends of the splines nearest the fastener's remote end 73. These berms require the retaining ring to flex outwardly to allow the retaining ring tabs 38a–c to ride over them. In use, the berms provide the useful advantage of keeping the fastener 70 in a retracted position when the retaining ring is secured with respect to a panel and the fastener head 74 is pulled away from the panel.

The retaining ring as shown in FIG. 8, as discussed above, is triangular in shape, having slightly bulging or arcuate sides 32, 34 and 36. The tabs 38a–c are located midway between the corner segments 31, 33 and 35. The retaining ring utilizes a hexagonal socket installation tool 100 as shown in FIG. 9 to install it on the panel fastener. The retaining ring 30 is inserted into the recessed opening 102 of the socket 100, and the hexagonal tool is slid over the fastener's remote end 73, with the retaining ring tabs 38a–c engaging the open-end spline 79. The tabs engage the entry slot 79 and are pushed toward the head of the fastener until they stop against surface 79a. When the retaining ring tabs reach the closed ends of the open-end splines, the tool is rotated to slide the tabs across the cross-over slots 85 to the closed-end splines 82. As the hexagonal socket tool is rotated clockwise, the tabs intersect ramp angle 88. Further rotation causes the tabs to spring radially outward until surface 91 is reached. Continued rotation into spline 82 results in the tab to snap back to their original dimension.

Since the tabs are located midway between the driving corners of the hexagonal tool, there is no resistance of the tabs to deflect radially except by design. With this design, the hexagonal tool does not constrain or limit the allowable deflection of the tabs to pass over ramps 88 and 91.

It should be appreciated from the foregoing description that the present invention provides an improved fastener and retaining ring combination. A fastener in accordance with the present invention is suitable for application in either externally or internally threaded applications and is not dependent on the orientation between the fastener and the retaining ring to secure the ring in place. The present invention has been described with respect to alternative embodiments, but it is to be understood that changes and modifications can be made to the invention which are encompassed as hereinafter claimed.

What is claimed is:

1. A fastener assembly comprising:
    an elongated shaft having an exterior surface defining a plurality of first longitudinally-oriented splines extending to one end of the shaft, and a plurality of second longitudinally-oriented splines terminated short of the end of the shaft and circumferentially spaced from the first splines;
    a substantially triangular retaining ring having an inwardly-directed tab located in a middle portion of each continuously curved concave shaped side of the retaining ring and adapted to slide onto the elongated shaft, with the tabs projecting into the first splines; and
    a plurality of circumferentially-oriented cross-over slots interconnecting the first and second splines sized to retain the tabs of the retaining ring in the second spline.

2. The fastener of claim 1 wherein the cross-over slots have a depth less than the depth of the second splines and are sized to require the retaining ring to flex to permit transition of the ring tabs between the first splines and the second splines.

3. The fastener assembly of claim 1 wherein the cross-over slots form a ramp having a greater depth adjacent the first splines than adjacent the second splines.

4. The fastener assembly of claim 1 wherein the cross-over slots form a generally smooth ramp having a continuously varying depth from a maximum adjacent the first splines to a minimum adjacent the second splines.

5. The fastener assembly of claim 1 wherein the cross-over slots open into the first splines adjacent a closed end of the first splines, and open into the second splines at a location spaced from its two ends.

6. A fastener assembly comprising:
    a substantially triangular retaining ring having inwardly directed tabs positioned along each continuously curved concave shaped side of the retaining ring at a location away from an intersection of two adjacent sides; and
    a shaft having an external surface defining a plurality of pairs of splines, one of the pairs having an open end, and the other of the splines having a closed end, and a cross-over slot for each pair of splines wherein the retaining ring may be disposed over the shaft by inserting the ring tab into the open slot and rotating the ring through the cross-over slot into the closed-ended slots.

7. The fastener assembly of claim 6 wherein the tabs on the retaining ring are positioned in the middle of each side of the retaining ring.

8. A retaining ring for a fastener comprising:
    a first continuously arcuate concave shaped side;
    a second continuously arcuate concave shaped side extending from the first side;
    a third continuously arcuate concave shaped side extending between and connected to the first and second arcuate sides; and
    an inwardly projecting tab positioned on each of the first, the first, second and third sides configured to form a substantially triangular shape second and third sides at a location away from an intersection of two adjacent sides.

9. The retaining ring of claim 8 wherein each tab is located in the middle of each side.

* * * * *